United States Patent [19]

Carter et al.

[11] Patent Number: 4,957,672
[45] Date of Patent: Sep. 18, 1990

[54] METHOD OF FORMING A SEALING GASKET FOR RETICULATED FOAM FILTER

[76] Inventors: Robert W. Carter; Robert W. Carter, both of 2745 Yosemite Dr., Belmont, Calif. 94002

[21] Appl. No.: 322,459

[22] Filed: Mar. 10, 1989

Related U.S. Application Data

[63] Continuation-in-part of Ser. No. 128,832, Dec. 4, 1987, abandoned.

[51] Int. Cl.⁵ ............................................. B29C 67/22
[52] U.S. Cl. ................... 264/45.5; 264/46.4; 264/275; 264/DIG. 48
[58] Field of Search .............. 264/45.1, 46.4, 46.7, 264/252, DIG. 48, 45.5, 275

[56] References Cited

U.S. PATENT DOCUMENTS

| | | | |
|---|---|---|---|
| 3,183,285 | 5/1965 | Boylan | 264/DIG. 48 |
| 3,929,948 | 12/1975 | Welch et al. | 264/46.7 |
| 4,138,283 | 2/1979 | Hanusa | 264/46.7 |
| 4,631,077 | 12/1986 | Spicer et al. | 55/500 |

FOREIGN PATENT DOCUMENTS 59-005041  1/1984  Japan ................... 264/46.4

Primary Examiner—David Simmons
Assistant Examiner—Allan R. Kuhns
Attorney, Agent, or Firm—Townsend and Townsend

[57] ABSTRACT

A sealing gasket of foamed plastic is formed at the edge of a filter element of reticulated foam by placing the filter element on a surface adjacent to an open receptacle contoured as a mold for the desired shape of the gasket, filling the receptacle with a foam-forming liquid and avoiding contact between the liquid and the filter element until the liquid begins to froth. The liquid is then permitted to froth and overflow the receptacle on the side facing the filter element. As the froth contacts the filter element and proceeds to cure, it bonds to the edge of the elements without substantially penetrating its open pore network. The result upon curing is a gasket along the edge of a filter element fully bonded thereto without gaps or bypass, yet leaving substantially all of the surface area of the filter element exposed for use as a filter.

14 Claims, 2 Drawing Sheets

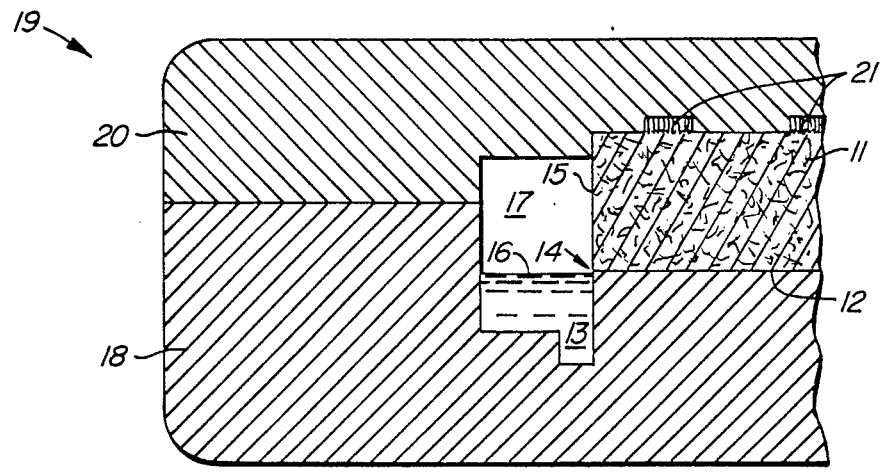
FIG._1.
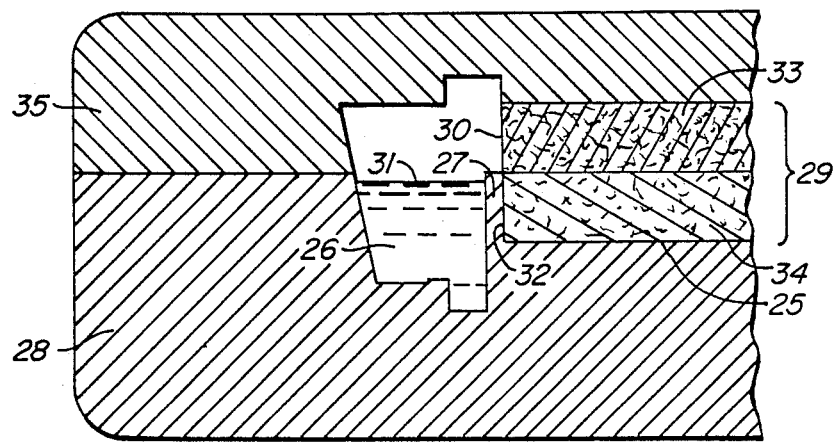
FIG._3.

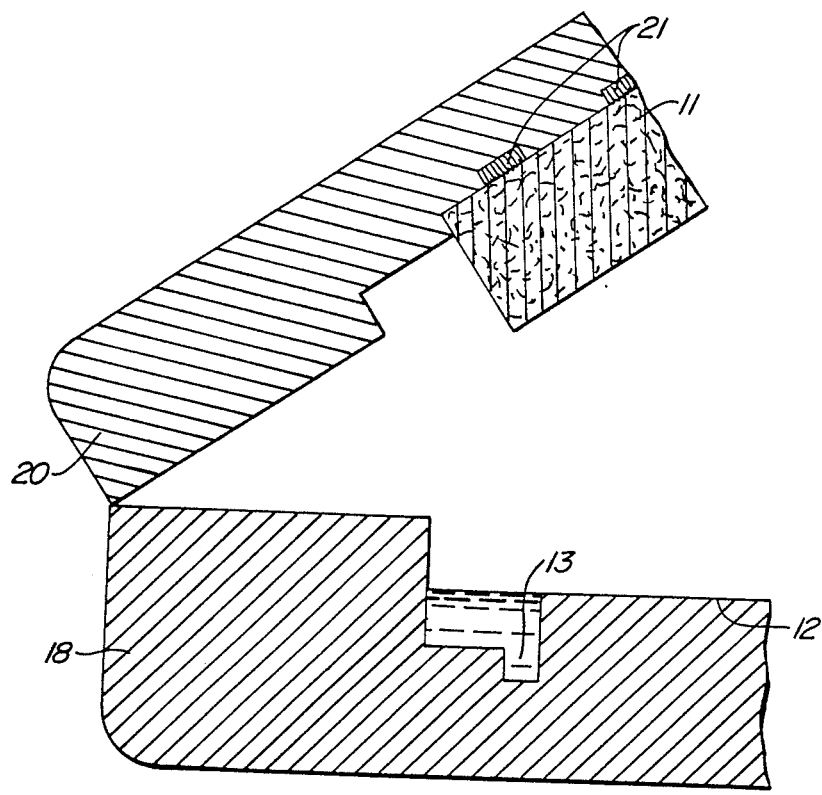
FIG._2.
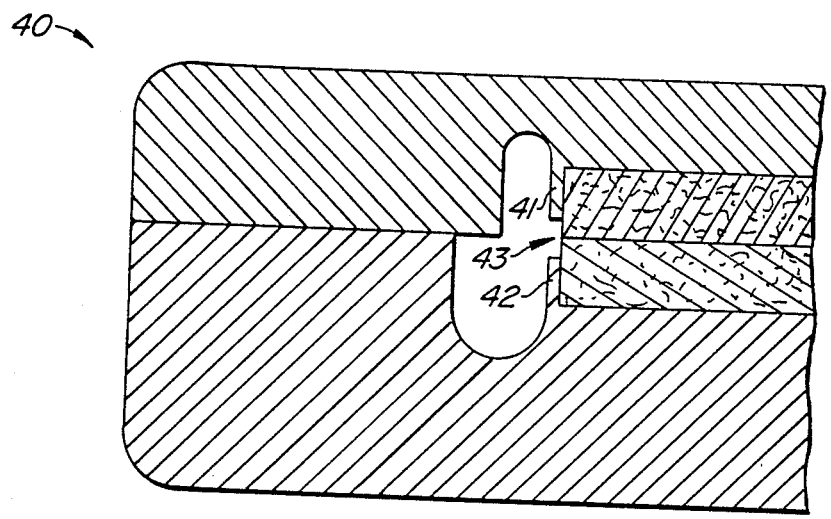
FIG._4.

4,957,672

METHOD OF FORMING A SEALING GASKET FOR RETICULATED FOAM FILTER

CROSS REFERENCE TO RELATED APPLICATION

This application is a continuation-in-part of application Ser. No. 07/128,832, filed Dec. 4, 1987.

BACKGROUND OF THE INVENTION

Reticulated plastic foams are gaining in popularity as filter elements for internal combustion engines and various other applications where air or oil must be filtered to remove particulate contaminants prior to use. These filters generally consist of slabs of a plastic foam whose cells have been reticulated to form an open network of pores permitting flow-through of fluids while retaining particles of dust and grit. These slabs are manufactured in varying thicknesses and pore sizes depending on the type of service for which they will be used, taking into consideration the quantity and particle size range of the contaminants and the viscosity and flow rate of the liquid or gas which must pass through the slab. Multiple layers of varying porosities and thicknesses are frequently used.

The advantage of reticulated foam filter elements is that they offer a high capacity for particulate retention and yet have a prolonged permeability to the passing fluid. In addition, they are capable of being fully regenerated.

When mounting these filter elements in the fluid stream, one must seal the edges to prevent bypass and form a mounting frame which suspends the filter element in the air stream. In the optimum case, this would be achieved by a sealing gasket around the periphery of the element which does not distort the shape of the element or cover any of the surface or reduce the area of the filter element.

Closed-cell (or at least unreticulated) polymeric foams are favored as the gasket material since they can be cured in a mold conforming to any desired shape. A further advantage of these foams is that they bond directly to the reticulated filter element in a secure manner as they are curing. Forming a gasket with these foams along the edge of a slab of preformed reticulated foam is problematic, however, since the foam-forming liquid used to form the gasket permeates the open pore network of the filter element. This is a waste of the sealing material and it reduces the amount of exposed filter element available for filtering and forms a skin on the filter surface that is very restrictive to air passage.

SUMMARY OF THE INVENTION

It has now been discovered that sealing foam gasket materials may be applied to the edge of a reticulated foam filter element in a manner which causes bonding of the gasket material to the edge of the reticulated foam filter element without substantial penetration into the open pore network of the filter element. This is achieved by placing the foam-forming liquid and the preformed and precut reticulated filter element in receptacles which keep them out of contact until the liquid froths, then permits the frothing liquid to flow over toward the edge of the filter element, to form a bond therewith and cure to a solid, substantially fluid-impermeable form.

One of the unusual aspects of this discovery is that when the foam-forming liquid is in its frothing state, it will not penetrate the open pore network of the filter element to any substantial degree. Contact between the two is thus permitted only after the liquid has begun to froth. Physical considerations or configurations to achieve this separation and subsequent contact upon foaming may vary widely depending on the desired shape or configuration of the sealing gasket rim of the finished product. The effect may be achieved for example by placing the filter element alongside a receptacle whose interior space is shaped in the form of the desired shape of the gasket. The receptacle is then filled with the foam-forming liquid or prepolymer to a liquid level which avoids contact between the liquid and the filter element. The liquid is then permitted to froth, causing its level to rise and flow over the edge of the receptacle facing the filter element. Curing of the froth to a dry foam occurs while the froth is in contact with the edge of the filter element. The receptacle may assume a variety of forms, depending on the shape of the sealing gasket which one seeks to form along the filter element edge. Likewise, the position of the filter element relative to the receptacle may vary subject to similar considerations.

These and other features of the invention are explained in further detail below.

BRIEF DESCRIPTION OF THE DRAWINGS

FIG. 1 is a side sectional view of a mold implementing one embodiment of the present invention.

FIG. 2 is a side sectional view of the mold of FIG. 1 shown in an open position.

FIG. 3 is a side sectional view of a mold implementing a second embodiment of the present invention.

FIG. 4 is a side sectional view of a mold implementing a third embodiment of the present invention.

DETAILED DESCRIPTION OF THE INVENTION AND PREFERRED EMBODIMENTS

In accordance with the present invention, the foam-forming liquid and the filter element are arranged such that the foam-forming liquid must undergo a certain degree of frothing in order to expand sufficiently to reach the periphery of the filter element, this degree of frothing being sufficient to produce a surface on the froth which is strong enough to prevent the froth from penetrating the filter element. Arrangements which permit this to occur are described below. In one such arrangement, the peripheral surface of the filter to which the foam is to bond is placed parallel to the direction of expansion of the foam, thereby forming a lateral boundary of the expansion space. Other arrangements generally involve a displacement between the filter periphery and the foam-forming liquid, the displacement being of a sufficient distance to require expansion of the foam before contact is made.

In one embodiment of the present invention, a receptacle for the foam-forming liquid serves as a mold defining the shape of the gasket edge which is formed on the filter element. The receptacle may be a trough running along the edge of a surface on which the filter element is placed. The foam-forming liquid is placed in the trough such that the liquid level is below the rim which defines the boundary between the trough and the filter element support surface. The outer wall of the trough, opposite the separating rim, extends above the rim to contain the frothing liquid as it rises, while on the other side the froth rises above the separating rim and comes in contact with the edge of the filter element.

An illustration of this type of arrangement is shown in FIG. 1. The reticulated foam filter element 11 is placed on a surface 12 adjacent to a trough 13, which runs the length of the surface, with a rim 14 defining the boundary between the surface 12 and the trough 13. The edge 15 of the filter element 11 along which the sealing gasket is to be formed is aligned parallel to the trough 13 and placed directly above the rim 14. The foam-forming liquid is added to the trough 13 to a fill line 16 which is at or below the level of the rim 14 leaving an open space 17 above the liquid. The edge 15 in the filter element along which the sealing gasket is to be formed is exposed to the open space 17.

The trough 13 and the filter element support surface 12 in this embodiment are formed in the lower portion 18 of a two-part mold 19. The upper portion 20 fits over the lower portion 18 to enclose the trough 13 and open space 17, leaving space for the filter element 11. A preferred way of loading the mold when using the configuration shown in FIG. 1 involves first placing the filter element 11 in the upper portion 20 of the mold, then adding the foam-forming liquid to the trough 13 and closing the mold. The filter element 11 may be held in place by an adhering material such as a hook and loop type fastener 21 (e.g., Velcro strips) as shown in the Figure, or a vacuum drawn through the upper portion 20 of the mold, or equivalent means.

As the foam forming liquid in the trough 13 froths, it rises to fill the open space 17, where it proceeds to cure into a closed-cell resilient foam of substantially uniform density and consistency, filling the entire space formed by the combined trough 13 and open space 17. Only in the frothed state does the liquid reach the exposed edge 15 of the filter element, and in this state it bonds to the exposed edge forming a seal substantially devoid of gaps along the length of the edge, without substantially penetrating into the open pore network of the filter element 11. As the froth cures and is allowed to set for a sufficient time to permit its removal intact from the mold, it thus forms a sealing gasket along the edge 15 and extending below as shown. The extension may be desirable for purposes of mounting the filter element in an air or oil intake line. Alternatively, the extension may be cut off and discarded to make the lower surfaces of the gasket and the filter element coplanar.

The mold cavity which holds the reticulated foam filter element is shaped in such a manner that it causes no distortion of the element in any manner which would restrict fluid flow through the element. Thus, no pinching or compression of the filter element occurs along its periphery as the mold is closed. Penetration avoidance is accomplished strictly by the surface characteristics of the froth. In preferred embodiments, the mold does not compress the filter element at all. This is demonstrated in FIG. 2, in which the upper and lower portions 20, 18 of the mold are shown in a open position, just after the filter element 11 and the foam-forming liquid have been placed in position and prior to the foaming reaction. Note that the filter element 11 in the open mold has the same dimensions as when the mold is closed (FIG. 1), indicating that there is no distortion or compression of the filter element by the mold during the foaming reaction when the mold is closed.

An alternate embodiment is shown in FIG. 3. In this embodiment, the filter element support surface 25 and the trough 26 are separated by a dam 27. The support surface 25 thus forms the floor of a recess in the bottom portion 28 of the mold, and a filter element 29 is placed in this recess against the dam 27. Only an upper portion 30 of an outer edge of the filter element is exposed above the dam 27. Thus, when the foam-forming liquid is placed in the trough 26 up to a fill line 31 just below the upper edge of the dam 27, and permitted to froth, the resulting froth contacts only the upper portion 30 of the filter element edge.

This may be used to advantage in a number of ways. For example, it forms a peripheral sealing gasket along the filter element edge leaving a lower portion 32 of the filter element edge exposed for insertion into a mount, and a broad skirt portion on the gasket extending from the upper edge of the dam 27 on downward, which may be useful to facilitate clamping. As another example, the arrangement can be used for a filter element comprised of multiple layers such as the two-layer arrangement shown. The upper layer 33 is of relatively small pore size and the lower layer 34 (or layers) is of larger pore size which might have a tendency to permit an undesirable degree of froth penetration if the froth were to contact it directly. The advantage in such an arrangement is that upper layer 33 prevents the froth from reaching the lower layer or layers 34, since penetration of the froth into the upper layer 33 is minimal if not avoided entirely.

As in the embodiment shown in FIG. 1, the mold has an upper portion 35 which encloses the open space 36 of the trough 26, confining the expansion of the foam to a restricted volume and shape and thereby defining the shape of the finished gasket. Also as in the embodiment of FIG. 1, the portion of the mold cavity which holds the filter element conforms to the shape of the filter element in its relaxed state so that no compression of the element occurs as the mold is closed.

A further alternative embodiment is shown in FIG. 4. The mold 40 in this embodiment has two dams 41, 42, at the top and bottom, respectively, of the space occupied by the filter element. As a result, only a central portion 43 of the filter element is contacted by the froth, and the resulting gasket is bonded to the filter element at this location only.

In general, the use of an enclosed mold is preferred, since it controls the shape of the finished gasket, and adds a means of controlling the density by the height of the fill line relative to the height of the sealing of the mold cavity. As noted below, the density will be further controlled by selection of the foam-forming liquid. As noted in the embodiments shown in the drawings, the mold cavity may be shaped to provide the gasket with appendages such as gripping shoulders, ledges, extensions, skirts and ridges for purposes of facilitating the mounting of the filter element into the structure in which it is to be used. The mold also permits one to apply temperature control to the foam formation process.

The reticulated foam filter will be preformed prior to placing it in the mold for formation of the gasket along its edge. The preformed filter element will generally be in the form of a slab, although other geometrical configurations may be used. In some applications, the slab may be curved into a cylindrical configuration for alternate use. In many cases, the filter element may be multi-layered, each layer consisting of a foam of a different pore size. All filter elements contemplated for use in the present invention, however, will be made up of open pores forming a reticulated network admitting full passage of fluid, be it gas or liquid, through the elements. Such filter element materials are presently known and commercially available from a number of sources supplying them for automotive and other uses. These sources include Scotfoam Corporation, Eddystone, Pennsylvania. Crest Foam Los Angeles, California, and Recticell, Chicago, Illinois. Examples are also disclosed in the patent literature, including Spicer, et al., U.S. Pat. No. 4,631,077, issued Dec. 23, 1986.

The term "reticulated foam" is used herein as it is commonly used among those skilled in the art, to denote solid foamed materials where all intervening walls have been removed from the cells of the foam, leaving a network consisting essentially of interconnected fibers along the outlines of the cells formed during the foaming. This is achieved by known foam processing procedures applied to the foam after the cells have been formed. These procedures generally involve the use of caustic or thermal treatments of the foam, removing all "window walls" separating the cells, throughout the foam. Accordingly, such foams are limited to plastics which are susceptible to such treatments, since not all foamed plastics are.

Reticulated foams are thus distinct from foams in which the window walls are merely broken, or foams in which only the outermost window walls or skin have been removed by physical means. Reticulated foams, by virtue of their total lack of window walls, are highly permeable to gas and liquid alike, offering little resistance to fluid flow, indeed much less than those foams in which the window walls have been retained.

The pore size of the reticulated foam may vary. The present invention is of particular interest, however, for use with reticulated foams having from about 20 to about 65 pores per inch (50–165 pores per cm), measured linearly.

The material used to form the sealing gasket may be a foam-forming liquid which under controlled conditions will froth and cure to form a resilient rubber-like material formed from a network of substantially closed cells which are substantially less permeable to fluids than the filter element itself. A wide range of plastic foams may be used. Examples include polyurethanes, polyvinylchlorides, polyethylenes, polypropylenes, polyisocyanurates, polyphenols, and foams from epoxy resins and silicone resins. Specific materials in each of these classes will be selected by those skilled in the art based on the properties sought for the finished product as well as economic and practical considerations in the foam-forming process. These properties will include the density and resiliency of the final product as well as its cell size, and the processing considerations will include preferred time periods for the cream time, frothing time, curing time, and time which the cured resin will be required to set in the mold before it can be removed. Since the foam-forming liquid will generally be a polymerizable liquid, the parameters which can be varied to meet these requirements can be the molecular weight, degree of porosity, and amount of catalyst, inclusion of surface active agents, relative amounts of ingredients, and others. Polyurethane foams are preferred. A combination which has been found to be particularly useful is that involving approximately two parts of a polyol designated NB 381186 (glycols and aliphatic amines), to one part of a polymeric diphenylmethane diisocyanate designated MONDUR MRS-2, both available from a variety of sources, notably Mobay Chemical Corporation, Pittsburgh, Pennsylvania and PDL Inc., Orange, California.

The effectiveness of the present invention is due at least in part to a skin which forms on the surface of the froth. The skin, although not yet solidified, resists penetration into the reticulated cell network of the filter element. This resistance will vary to some extent with the thickness of the skin, which can be controlled by selection of the ingredients used in the foam-forming liquid, and also by the temperature at which the froth is permitted to form. The resistance will also vary with the degree of frothing occurring before contact between the two occurs. Lower temperatures generally promote the formation of thicker skins which in turn promote higher penetration resistance.

Frothing and curing of the sealing material may be achieved by conventional processes known to those skilled in the art. These processes will vary depending upon the particular polymer used to form the foam. The foam formation may be controlled by the inclusion of additives or cell-control agents selected to influence the nucleation of the foam cells, either through their effect on the surface tension of the system or by acting as nucleating sites from which the cells can grow, foam formation may be temperature-induced or pressure-induced (i.e., by lowering the external pressure or increasing the internal pressure in the cells). Other methods include dispersing gas into the foam-forming liquid, or sintering polymer particles in the presence of a gas phase.

Preferred foaming plastics are those which begin to foam upon the initial contact of the monomers or the monomers and catalysts, and foam at an increased rate upon exposure to elevated temperature. Included among these are those which undergo an exothermic reaction upon foaming. In the particularly preferred system noted above, the foaming is readily induced by mixing the components of the foam-forming liquid at a temperature of approximately 80° F. (27° C.) and placing them in a mold which has been preheated to approximately 100° F. (100° C.). The molecular weights of the starting materials and their molecular structures, including chain lengths, number of functional groups per unit, relative quantity of cross-linking agent, and other well-known parameters, will be selected to cause the foaming and curing processes to occur at speeds most convenient for the filling of the mold and the control of the reaction. As an example, a long cream time, approximately ten to fifteen seconds, is generally preferred, to be followed by a short reaction time of approximately one to three minutes, which is then followed by a demold (final setting) time of as short a duration as possible, preferably on the order of seven to eight minutes.

As mentioned above, the shape of the mold and particularly the liquid fill line and its location relative to the total volume of the foam space in the mold, will determine the density of the finished gasket. The actual density is not critical and can vary over a wide range. As stated above, the molecular structure of the reactants may be to vary the degree of cross-linking in the final polymer. The average molecular weight between cross links will determine the rigidity or flexibility of the final foam. For polyurethanes, this number will range from about 1,000 to about 20,000. This may also be expressed in terms of the equivalent weight per hydroxide unit in the resin. For a suitable compromise between flexibility and rigidity in a gasket material, the equivalent weight will generally range from about 200 to about 10,000.

The foregoing is offered primarily for purposes of illustration. It will be readily apparent to those skilled in the art that variations and modifications of the elements of structure, function and operation described here may be made without departing from the spirit and scope of the invention.

What is claimed is:

1. A process for bonding a cellular plastic foam formed by frothing reactants to a peripheral region on a reticulated foam article, comprising:
   (a) combining said reactants into a mixture;
   (b) placing said mixture and said reticulated foam article into a mold cavity without contacting each other, said mold cavity being shaped to avoid distortion of said reticulated foam article in any manner which would restrict fluid flow therethrough from said peripheral region, and to permit contact of said mixture with said peripheral region only upon frothing of said mixture; and
   (c) bringing said mixture to a frothing state in which a penetration-preventing skin is formed on the surface thereof, and said mixture is expanded sufficiently to contact said peripheral region, while avoiding any distortion of said reticulated foam article which would restrict fluid flow therethrough from said peripheral region, to bond thereto without penetrating into said reticulated foam article.

2. A process in accordance with claim 1 in which said reactants polymerize upon contact and simultaneously generate a gaseous by-product.

3. A process in accordance with claim 1 in which said reactants comprise an organic polyhydroxyl compound and an organic polyisocyanate.

4. A process in accordance with claim 1 in which step (c) comprises heating said mixture to a temperature above ambient temperature.

5. A process in accordance with claim 1 in which step (b) is an exothermic reaction.

6. A process for forming a sealing gasket on a filter element of reticulated foam having a pore size of about 20 to 65 pores per inch, said process comprising:
   (a) placing said filter element beside an open receptacle in a manner avoiding any distortion of said filter element which would restrict fluid flow therethrough;
   (b) placing in said open receptacle a foam-forming liquid curable to a resilient fluid-impermeable solid, while substantially avoiding contact between said foam-forming liquid and said filter element;
   (c) foaming said foam-forming liquid into a foam having a penetration-preventing skin on the surface thereof, said foam being of sufficient volume to overflow said receptacle and contact said filter element; and
   (d) curing said foam;
steps (c) and (d) both being performed while avoiding any distortion of said filter element which would restrict fluid flow therethrough and without penetration of said foam into said reticulated foam article.

7. A process in accordance with claim 6 comprising forming said sealing gasket along an edge of said filter element, in which said open receptacle is a trough coextensive with said edge.

8. A process in accordance with claim 6 comprising forming said sealing gasket along an edge of said filter element, in which step (a) comprises placing said filter element beside said open receptacle such that at least a portion of said edge extends above said open receptacle.

9. A process in accordance with claim 8 in which said open receptacle is a trough coextensive with said edge with a rim along one side, step (a) comprises placing said filter element on a surface adjacent to said rim with said edge facing said receptacle.

10. A process in accordance with claim 9 in which said surface is coplanar with said rim.

11. A process in accordance with claim 9 in which said surface is recessed below said rim.

12. A process in accordance with claim 6 further comprising securing a lid over said receptacle prior to step (c) to form an enclosure defined by said receptacle, said lid, and an edge of said filter element, said enclosure avoiding any distortion of said filter element which would restrict flow therethrough, and step (c) comprises foaming said foam-forming liquid to fill said enclosure.

13. A process for forming a molded sealing gasket on a filter element of reticulated foam, said process comprising:
   (a) placing a foam-forming liquid in a well in a bottom portion of a mold having top and bottom portions;
   (b) affixing said filter element to said top portion of said mold through adhering means in said top portion in a position which permits contact between said filter element and said foam-forming liquid only when said foam-forming liquid is in a frothing state and which avoids any distortion of said filter element which would restrict flow therethrough; and
   (c) closing said mold and bringing said foam-forming liquid to said frothing state having a penetration-preventing skin on the surface thereof, while avoiding any distortion of said filter element which would restrict fluid flow therethrough, to bond thereto without penetrating into said reticulated foam article.

14. A process in accordance with claim 13 in which said adhering means is a hook-and-loop type fastener.

* * * * *